United States Patent [19]
Ebert et al.

[11] Patent Number: 5,551,926
[45] Date of Patent: Sep. 3, 1996

[54] AUTOMATIC TENSIONING AND DAMPING ELEMENT FOR ENDLESS CHAIN DRIVES

[76] Inventors: Siegfried Ebert; Ilona Ebert, both of Radefelderstrasse 18, 04509 Freiroda, Germany

[21] Appl. No.: 379,940

[22] Filed: Jan. 27, 1995

Related U.S. Application Data

[63] Continuation-in-part of PCT/DE93/00610, Jul. 7, 1993 published as WO/02756, Feb. 3, 1994.

[30] Foreign Application Priority Data

Jul. 27, 1992 [DE] Germany .......................... 42 24 753.5

[51] Int. Cl.⁶ .................................................. F16H 7/08
[52] U.S. Cl. .......................................... 474/101; 474/136
[58] Field of Search ................................. 474/101, 111, 474/112, 133–138, 141

[56] References Cited

U.S. PATENT DOCUMENTS 3,574,287  4/1971  Heidacker .......................... 474/136
4,865,577  9/1989  Freudenstein ...................... 474/141

*Primary Examiner*—Michael Powell Buiz
*Attorney, Agent, or Firm*—Horst M. Kasper

[57] ABSTRACT

An automatic tensioning and damping element for endless chain drives includes an elastically deformable which automatic tensioning and damping element (3) exhibits a on its outer surface a guide profile matching the profile of the chain with a guide play and which automatic tensioning and damping element (3) is disposed pretensioned between the load strand (1) and the loose strand (2). The automatic tensioning and damping element (3) supports itself slidingly in the loose strand angle and is thus automatically controlling and self-adjusting in its distance relative to the chain wheels.

6 Claims, 2 Drawing Sheets

AUTOMATIC TENSIONING AND DAMPING ELEMENT FOR ENDLESS CHAIN DRIVES

CROSS-REFERENCE TO RELATED APPLICATIONS

This application is a continuation-in-part application of another international application filed under the Patent Cooperation Treaty on Jul. 7, 1993, bearing Application No. PCT/DE93/00610, published as WO94/02756, Feb. 3, 1994, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to an automatic tensioning and damping element for endless chain drives, wherein the application of the automatic tensioning and damping element is universal for chain drives to be tensioned diametrically.

2. Brief Description of the Background of the Invention Including Prior Art

An automatic tensioning and damping element is known from the German Democratic Patent document DD-WP 275,166. The element of the reference is a ring without an axis and made of an elastic material, where the ring is elastically deformable between the shape of a concentric ring and the shape of a cassinic curve with an ellipse-like form, and where the ring is adapted in its shape to the chain.

This tensioning and damping element is disposed between the strands of the chain drives, engages with its chain crown into the chain drives and thus secures automatically its position in the chain drive and tensions diametrically. The tensioning and damping element rolls without an axis and synchronously with the speed of the chain between the moving strands. The dilations of the chains are balanced by having the pretensioned tensioning and damping element aspire to assume the shape of a concentric ring, wherein the distance between the secondary summits of the tensioning and damping element is enlarged based on the symmetry center at a maximum of up to the diameter of the concentric ring. This function is performed in opposite by decreasing the distance between the secondary summits for damping of load peaks.

Advantageously, such tensioning and damping elements are produced of materials with defined elastic, visco-elastic, and plastic deformation parameters.

The disadvantage of this known automatic tensioning and damping element includes that back distortion energy is used during the rolling. This back-distortion energy is not necessary in every case for the instantaneous suppression of longitudinal vibrations and of larger transverse vibrations of the chain drive.

The technical cause of this disadvantage is associates with the rolling motion, where the rolling motion is synchronous with the chain speed of the automatic tensioning and damping element, is from the position-securing engagement of the tooth profile into the strand. Depending on the material, the plastic deformation part as well as, in case of a corresponding trailing of the material-dependent visco-elastic restoring relative to the speed-dependent back distortion, the visco-elastic deformation part of the ring has to be formed back.

SUMMARY OF THE INVENTION

1. Purposes of the Invention

It is an object of the invention to provide an automatic tensioning and damping element for endless chain drives with smaller energy usage.

The technical purpose of the invention is comprised in the development of an automatic tensioning and damping element for endless chain drives, where the rolling of the automatic tensioning and damping element occurs automatically and position-securingly but not synchronously with the chain speed.

These and other objects and advantages of the present invention will become evident from the description which follows.

2. Brief Description of the Invention

The present invention provides for an automatic tensioning and damping element for endless chain drives disposed as an elastically deformable element between a loose strand of a chain and a load strand of the chain. The automatic tensioning and damping element continuously acts simultaneously on the loose strand and on the load strand. An elastic arc piece has a surface profile matching with play a profile of the chain. The automatic tensioning and damping element includes an oppositely disposed and integrated chain guide section. The chain guide section is continuous and furnished with a surface profile matching with play the profile of the chain. The length of the chain guide section is larger than the distance of the smallest inner diameter of the elastic arc piece and the chain guide section.

The advantages obtained mainly with the invention include that the automatic tensioning and damping element is self-supporting and slidingly retained between the strands without rolling synchronously with the strands and without using energy for the purpose of synchronously rolling.

During operation, the automatic tensioning and damping element by self-adjustment and automatic control slidingly assumes a position corresponding to a tensioning force minimum, in the region of a loose strand angle, generated by tensioning, wherein the region of the loose angle is at the same time the region of the largest spread width, where the automatic tensioning and damping element does not touch a chain wheel in said position.

The automatic tensioning and damping element of the present invention is self-lubricating in a lubricated chain drive. It is independent of the sense of rotation and it is independent of the position, as well as disposable a plurality of times side-by-side in a multi-track chains. In addition, the automatic tensioning and damping element can be furnished with several tracks as a single piece. The tensioning path readjustment of the automatic tensioning and damping element is performed automatically up to its own tension-free state.

The mounting of the automatic tensioning and damping element between the strands is performed in the pretensioned state in the center of the distance between the chain wheels by a simple locking into the chain tracks. The automatic tensioning and damping element, composed of an arcuate section and a straight or bent chain guide piece, is disposed such between the strands that the elastic arc is carried and guided in the loose strand.

An automatic tensioning and damping element for endless chain drives comprises a deformable ring having a jacket profile matching with play a profile of a chain. The deformable ring has a shape continuously disposed between the shape of a concentric ring or of a radial deformation variation of a ring and the shape of a cassinic curve with an ellipse-like shape. The outer diameter of the ring or, respectively, the smallest length axis of the ring is larger than the diameter of the largest chain wheel of the chain drive. The automatic tensioning and damping element is disposed as an elastically deformable element between a loose strand and a load strand. The automatic tensioning and damping element continuously acts simultaneously on the loose strand and on the load strand.

A starting point is here an automatic tensioning and damping element with a concentric annular shape in an untensioned state. This element exhibits in case of a radial load a homogeneous bending resistance and damping over the complete ring circumference.

The tangentially engaging torques derived from the friction relative to the moving strands lead to a very slow rolling motion of the element in the rotation direction of the chain drive. The speed of this rolling motion depends on the amount of the tangentially engaging torques as well as on the bending resistance, the damping, and the creep tendency of the material. Based on this rolling motion, the complete outer circumference of the automatic tensioning and damping element is cyclically contacted by the strands. Thus, the wear faces are increased by a multiple, a uniform wear of the guide-shape-paired outer circumference is achieved and, correspondingly, the wear is decreased.

A torque directed in the rotation direction of the chain drive results during the operation of the automatic tensioning and damping element from the chain-contact-caused friction of the guide profile, adapted and matching with a guide play on the jacket side to the profile of the chain relative to the moving strands. A retaining torque from the operational space, delimited by the spreading of the strands of the chain, and the shape of the tensioning and damping element, deviating in a pretensioned state from the concentric circular ring and not capable of rolling in a radial direction is always opposed to the torque directed in rotation direction of the chain drive. As long as the automatic tensioning and damping element exhibits during the driving of the chain a pretension and thus a deviation in shape as compared to its tension-free concentric shape, then the tensioning and damping element is kept slidingly between the strands in the area of the strand angle and the automatic tensioning and damping element fulfills the tensioning and damping function. Thus, there results a prevention of a rolling synchronously with the chain speed according to the object of the invention. This embodiment of the invention can also be used in chain drives with reversal of rotation direction.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
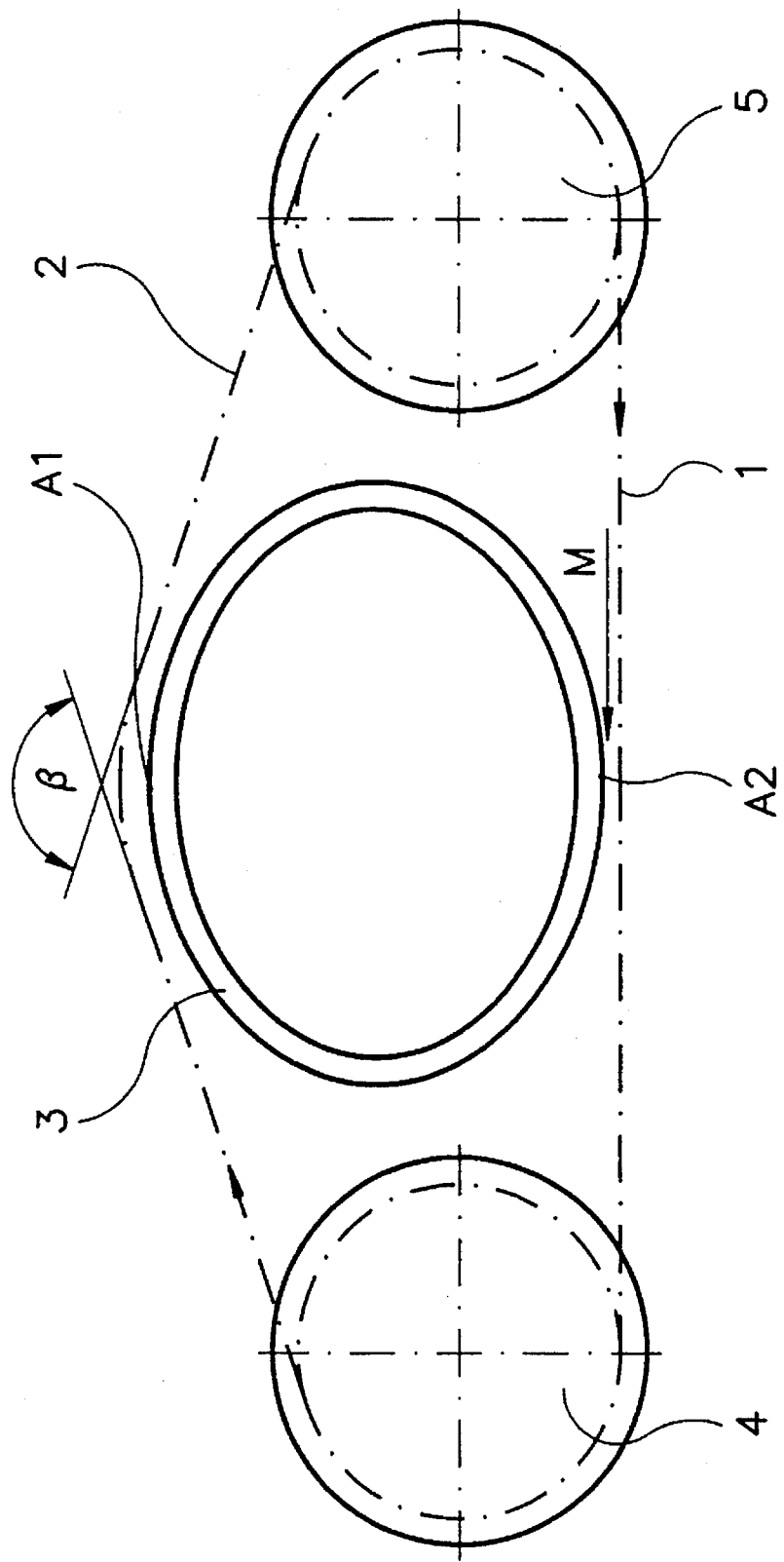
FIG. 1 is a view of a schematic diagram of a pretensioned automatic tensioning and damping element.

FIG. 1 shows an automatic tensioning and damping element 3 disposed pretensioned between a load strand 1 and a loose strand 2 of a non-translating, clockwise rotating chain drive with an ellipse-like shape in this state, and wherein the automatic tensioning and damping element is guide-shape paired and exhibits in its untensioned state a concentric ring shape.

The automatic tensioning and damping element is constructed guide-shape paired relative to and matched in form on its outer surface with the chain by having a rectangular guide profile at the outer circumference, which guide profile is smaller than the open width of the chain. In other words, the element 3 exhibits a planar circumferential jacket surface which is smaller than the open width of the chain. The circumferential jacket surface forms with its adjacent side surface a circumferential guide profile matching the guide profile of the chain with a guide play.

The automatic tensioning and damping element is made of a plastic with defined elastic properties, with time-dependent relaxing visco-elastic properties, and with time-independent plastic deformation properties. The respective elastic deformation components of the material amount to from about 35 to 70% of the total deformation. The respective visco-elastic deformation components of the material amount to from about 55 to 20% of the total deformation. The spring-equivalent tensioning properties are realized with the elastic deformation components and the shock-absorption-equivalent damping properties are realized with the visco-elastic as well as the plastic deformation components. The automatic tensioning and damping element is thereby provided as a machine construction element, which corresponds in its mechanical functioning to a spring shock-absorber device group.

Depending on the requirements on the tensioning and damping function, the tensioning force and the damping has to be determined. The tensioning and damping function is amongst other things dependent on the weight of the chain, on the speed of the chain, on the chain subdivision, on the number of teeth of the chain wheels concerned, on the distance between the axes of the chain wheels. The chain speed and the elastic deformation component, on the one hand, and the chain length, the chain subdivision, and the visco-elastic deformation component, on the other hand, are proportional to each other. The material should exhibit in addition minimum adhesive and sliding-friction values relative to the friction partner, represented by the chain. The known chip-removing, machining, or temperature-deformation technologies can be used for the production of the automatic tensioning and damping element out of plastic. The automatic tensioning and damping element exhibits a planar, circumferential jacket face which is narrower than the open width of the chain by a factor of about 0.05 to 0.1. This circumferential jacket face forms with its adjoining side faces a circumferential rectangular guide profile which matches the profile of the chain with a guide play. For a secure guiding of the automatic tensioning and damping element in soiled and poorly degrated chains it is advantageous to round off the corners of the guide profile, disposed toward the chain, or to furnish said corners with a phase or with a step.

The smallest axis A1, A2 of the automatic tensioning and damping element is larger by a factor 1.3 to 1.5 than the part circle diameter or pitch diameter of the largest chain wheel of the chain drive relative to the tension-free state, i.e. corresponding to the concentric ring shape.

The load strand between the driving chain wheel 4 and the driven chain wheel 5 runs straight, whereas the loose strand exhibits, based on the tensioning force of the automatic tensioning and damping element, a loose strand angle β<180°. The loose strand length, usable for the loose strand angle, is assured by the loose strand slack. The tensioning force is generated by having the ellipse-like shape aspire to assume the concentric shape, where the ellipse-like shape is effected based on a pretensioning of the originally concentric ring. An axial length ratio of 0.75:1 of the smallest axis A1–A2 relative to the perpendicularly disposed large axis is advantageous for the elliptic-like shape. The automatic tensioning and damping element is self-guiding and slidingly supported between the strands by having a guide profile matching the profile of chain.

The automatic tensioning and damping element is self-adjusting in its distance to the chain wheels based on the generation of the loose strand angle. The automatic tensioning and damping element always aspires slidingly to the tensioning force minimum, which corresponds at the same time to assume a largest possible distance A1–A2 between the chain strands, which largest possible distance is disposed in the region of the largest strand spread width. Thus, the automatic tensioning and damping element dispenses with a further degree of freedom in addition to the track guide in the chain, and thus assumes a position in the center of the distance between the chain wheels, where the automatic tensioning and damping element does not touch a chain wheel.

In an operating state of the apparatus, the friction of the guide profile relative to the moving strands caused by the contact with the chain generates a torque M in the direction of rotation of the chain drive. A restoring torque is always disposed opposite to the torque generated by the friction, which restoring torque results from the shape of the tensioning and damping element, wherein the tensioning and damping element is incapable of rolling in a radial direction in the operational space, delimited by the spreading of the strands, and in a pretensioned state deviating from the concentric circular ring. As long as the automatic tensioning and damping element exhibits during a chain drive a form deviation, resulting from the pretensioning, as compared to its concentric form, the automatic tensioning and damping element rests slidingly between the strands of the strand angle and fulfills the functions of tensioning and damping. The automatic tensioning and damping element, shown by way of example, is homogeneous over its ring shape relative to its bending stiffness and bending resistance, damping, and creep tendency.

Based on the oppositely directed motion of the chain strands, tangentially engaging torques derived from the friction relative to the strands, act on the automatic tensioning and damping element. These torques are added to the torque M acting on the automatic tensioning and damping element. The automatic tensioning and damping element, illustrated by way of example, is homogeneous over its annular shape with respect to bending resistance, damping, and creep tendency. The torque M leads to a very slow rolling motion of the automatic tensioning and damping element in the rotation direction of the chain drive. In case of a correspondingly large operating time, the complete outer circumference of the automatic tensioning and damping element comes in contact with the strands based on this rolling motion. Thus, a wear face is present over the complete outer circumference, a uniform wear of the guide profile is achieved and, correspondingly, the wear is reduced.

Figure 2:
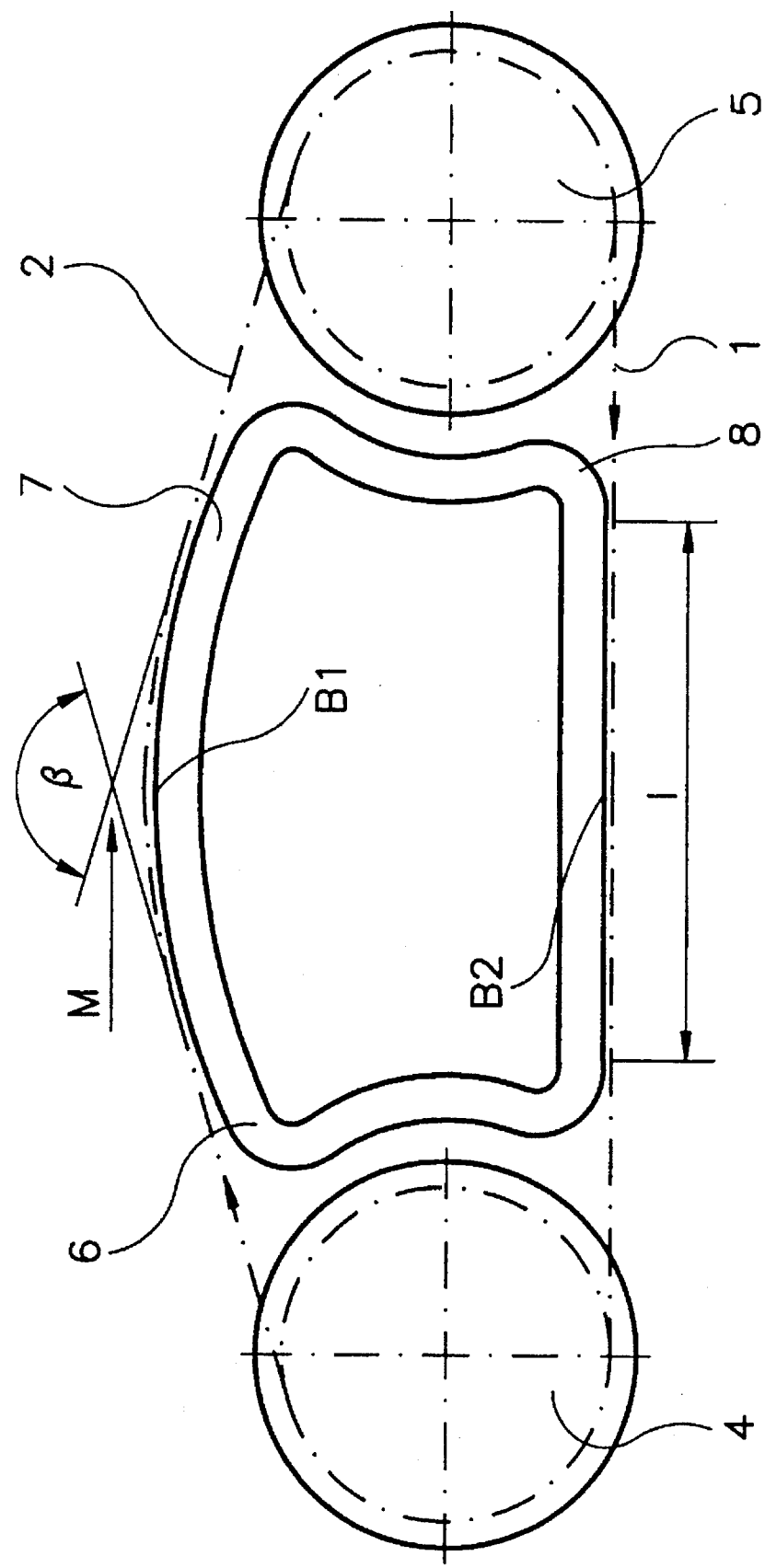
FIG. 2 is a view of a schematic diagram of an automatic tensioning and damping element during operation of a chain.

FIG. 2 shows a tensioning and damping element 6 with an elastic arc section 7 and a straight chain guide section 8, connected to the elastic arc section 7 and disposed oppositely to the elastic arc section 7, where the tensioning and damping element 6 is disposed guide-shape-paired between the load strand 1 and the loose strand 2 of a non-translating clockwise-rotating chain drive.

The material and the production technology are the same as those for the automatic tensioning and damping element in FIG. 1. The arcuate piece and the chain-guide piece exhibit planar jacket faces which are narrower than the open width of the chain by a factor from about 0.05 to 0.1. The respective jacket faces form together with the adjoining side faces a rectangular guide profile matching the profile of the chain with a guide play. It is advantageous for a secure guiding of the automatic tensioning and damping element in soiled or badly degrated guide profiles to furnish the corners of the guide profile, disposed towards the chain, with a rounded shape, with a step, or with a phase. The distance of the point B1, disposed on the jacket face of the elastic arcuate piece relative to the point B2, disposed on the jacket face of the oppositely disposed straight chain guide piece, is larger by a factor from about 1.3 to 1.5 than the effective diameter of the largest chain wheel of the chain drive relative to the tension-free state. The length l of the straight chain guide piece is larger than the distance B1, B2.

In each case, the automatic tensioning and damping element is disposed matched in form on its outer surface with the chain by a rectangular guide profile at the outer circumference of the elastic arc section and of the straight chain guide section. The guide profile is smaller than the open width of the chain. The distance B1, B2 of the elastic arc section of the chain relative to the oppositely disposed straight chain guide section is larger than the diameter of the largest chain wheel of the chain drive.

The load strand between the driving chain wheel 4 and the driven chain wheel 5 runs straight, whereas the loose strand exhibits a loose strand angle β<180° based on the tensioning force of the automatic tensioning and damping element. The loose strand length, usable for the loose strand angle, is assured by the loose strand slack. The tensioning force is generated by having the element, pretensioned by pressing the elastic arcuate piece against the straight chain guide piece, aspire to assume its tension-free starting shape, in particular by having the less curved, pretensioned arcuate shape of the elastic arcuate piece aspires to assume the more curved, untensioned arcuate shape.

The automatic tensioning and damping element is self-guiding and is slidingly disposed between the load strand and the loose strand based on the guide profile matching the profile of the chain with a guide play. The automatic tensioning and damping element is self-adjusting in its distance to the chain wheels based on the generation of the loose strand angle; the automatic tensioning and damping element always aspires slidingly to the tensioning force minimum, which corresponds at the same time to the largest distance B1, B2, which is disposed in the region of the largest strand spread width. Thus, the automatic tensioning and damping element deprives itself of a further degree of freedom in addition to the track guide in the chain, and thus assumes a position in the center of the distance between the chain wheels, where the automatic tensioning and damping element does not touch a chain wheel.

A torque M in the rotation direction of the chain drive results during operation of the automatic tensioning and damping element from the chain-contact-caused friction of the guide profile of the arcuate piece and of the chain guide piece relative to the moving strands. However, a restoring torque is always opposed to this torque M, wherein the restoring torque results from the operational space, delimited by the spreading of the strand and from the shape of the tensioning and damping element. As long as the length 1 of the automatic tensioning and damping element in the chain drive is larger than the distance between the points B1, B2, there is present a sufficiently large support face on the load strand and, in connection with the tension force, a sufficiently large static moment for the automatic tensioning and damping element. There exists a static stability relative to the torque M. The automatic tensioning and damping element holds itself slidingly in the strand angle without tipping over.

Based on the oppositely directed motion of the chain strands, tangentially engaging torques, derived from the friction relative to the strands, act on the automatic tensioning and damping element. These torques are added to the torque M. The length 1 of the straight chain guide section is larger than the distance B1, B2. Thus, a sufficiently large support base is present and a sufficiently large restoring force of the automatic tensioning and damping element on the load strand in connection with the tensioning force; thus, a static stability is present against the torque M. This automatic tensioning and damping element, illustrated by way of the example, can be employed space-savingly in chain drives with small distances between the axes.

It will be understood that each of the elements described above, or two or more together, may also find a useful application in other types of tensioning and damping elements differing from the types described above.

While the invention has been illustrated and described as embodied in the context of am automatic tensioning and damping device for endless chain drives, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automatic tensioning and damping element for endless chain drives comprising
    a deformable ring having a jacket profile matching with play a profile of a chain, and having a shape continuously disposed between the shape of a concentric ring and the shape of a cassinic curve with an ellipse-like shape, where the outer diameter of the ring is larger than the diameter of the largest chain wheel of the chain drive, wherein the automatic tensioning and damping element is disposed as an elastically deformable element between a loose strand and a load strand, and where the automatic tensioning and damping element continuously acts simultaneously on the loose strand and on the load strand.

2. The automatic tensioning and damping element for endless chain drives according to claim 1, wherein the automatic tensioning and damping element is made of a plastic with defined elastic properties, with time-dependent relaxing visco-elastic properties, and with time-independent plastic deformation properties;
    wherein the respective elastic deformation components of a material of the automatic tensioning and damping element amount to from about 35 to 70% of the total deformation; wherein the visco-elastic deformation components of the material of the automatic tensioning and damping element amount to from about 55 to 20% of the total deformation;
    wherein the spring-equivalent tensioning properties are realized with the elastic deformation components;
    wherein the shock-absorption-equivalent damping properties are realized with the visco-elastic as well as the plastic deformation components of the material.

3. The automatic tensioning and damping element for endless chain drives according to claim 1, wherein the automatic tensioning and damping element exhibits a planar, circumferential jacket face which is narrower than the open width of the chain by a factor of about 0.05 to 0.1; and
    wherein the circumferential jacket face forms with its adjoining side faces a circumferential rectangular guide profile which matches the profile of the chain with a guide play.

4. An automatic tensioning and damping element for endless chain drives, where the automatic tensioning and damping element is disposed as an elastically deformable element between a loose strand and a load strand, and where the automatic tensioning and damping element continuously acts on both strands simultaneously, comprising a deformable ring having a jacket profile matching with play the profile of the chain, and having a shape between the shape of a concentric ring and the shape of a cassinic curve with an ellipse-like shape, where the outer diameter of the ring is larger than the diameter of the largest chain wheel of the chain drive.

5. The automatic tensioning and damping element according to claim 4, wherein the chain guide section has a straight form.

6. The automatic tensioning and damping element according to claim 4, wherein the chain guide section has an arcuate form.

* * * * *